US008127136B2

(12) United States Patent
Yun et al.

(10) Patent No.: US 8,127,136 B2
(45) Date of Patent: Feb. 28, 2012

(54) METHOD FOR SECURITY ASSOCIATION NEGOTIATION WITH EXTENSIBLE AUTHENTICATION PROTOCOL IN WIRELESS PORTABLE INTERNET SYSTEM

(75) Inventors: Mi-Young Yun, Daejeon (KR); Jung-Mo Moon, Seoul (KR); Chul-Sik Yoon, Seoul (KR); Yeong-Jin Kim, Daejeon (KR)

(73) Assignees: Samsung Electronics Co., Ltd (KR); Electronics and Telecommunications Research Institute (KR); KT Corporation (KR); SK Telecom Co., Ltd (KR); KTFreetel Co., Ltd (KR); Hanaro Telecom., inc. (KR)

( * ) Notice: Subject to any disclaimer, the term of this patent is extended or adjusted under 35 U.S.C. 154(b) by 1236 days.

(21) Appl. No.: 11/661,172

(22) PCT Filed: Feb. 17, 2005

(86) PCT No.: PCT/KR2005/000447
§ 371 (c)(1),
(2), (4) Date: Feb. 26, 2007

(87) PCT Pub. No.: WO2006/022469
PCT Pub. Date: Mar. 2, 2006

(65) Prior Publication Data
US 2007/0297611 A1  Dec. 27, 2007

(30) Foreign Application Priority Data
Aug. 25, 2004 (KR) .................. 10-2004-0067107

(51) Int. Cl.
*H04L 9/32* (2006.01)
*G06F 7/04* (2006.01)
*H04K 1/00* (2006.01)
(52) U.S. Cl. ............. 713/171; 713/168; 726/3; 380/270
(58) Field of Classification Search .................. 713/168, 713/171; 726/3; 380/270
See application file for complete search history.

(56) References Cited

U.S. PATENT DOCUMENTS
5,371,794 A   12/1994 Diffie et al.
(Continued)

FOREIGN PATENT DOCUMENTS
EP   1 081 895 A1   3/2001
(Continued)

OTHER PUBLICATIONS

Johnston, David et al., "Overview of IEEE 802.16 Security", IEEE Security & Privacy May/Jun. 2004, pp. 40-48.*

(Continued)

*Primary Examiner* — Michael Pyzocha
(74) *Attorney, Agent, or Firm* — The Farrell Law Firm, P.C.

(57) ABSTRACT

The present invention relates to a security association negotiation method of extensible authentication protocol (EAP) for authenticating a subscriber station user in a wireless portable Internet system. An exemplary security association negotiation method using a user authentication in a wireless portable Internet system according to an embodiment of the present invention includes following steps. A base station generates an authentication key for authenticating a user of a subscriber station. The base station receives a security association capability request message including security association capability information of the subscriber station from the subscriber station after generating the authentication key. The base station determines whether the base station is able to accept a security association capability of the subscriber station included in the security association capability request message. The base station transmits a security association capability response message including the security association capability information which is selected for a security association with the subscriber station by the base station when the security association capability of the subscriber station can be accepted. According to the present invention, a subscriber authentication for EAP may be efficiently performed without an additional message after a handover.

20 Claims, 8 Drawing Sheets

U.S. PATENT DOCUMENTS

| | | | |
|---|---|---|---|
| 5,657,390 A * | 8/1997 | Elgamal et al. | 713/151 |
| 7,194,763 B2 * | 3/2007 | Potter et al. | 726/7 |
| 7,219,223 B1 * | 5/2007 | Bacchus et al. | 713/150 |
| 7,574,599 B1 * | 8/2009 | Zhang | 713/168 |
| 2001/0005885 A1 * | 6/2001 | Elgamal et al. | 713/164 |
| 2003/0026430 A1 * | 2/2003 | Aikawa et al. | 380/277 |
| 2003/0045229 A1 * | 3/2003 | Snelgrove et al. | 455/3.05 |
| 2003/0097592 A1 * | 5/2003 | Adusumilli | 713/201 |
| 2004/0010713 A1 | 1/2004 | Vollbrecht et al. | |
| 2004/0101125 A1 * | 5/2004 | Graf et al. | 379/229 |
| 2004/0103282 A1 * | 5/2004 | Meier et al. | 713/171 |
| 2004/0136533 A1 * | 7/2004 | Takagaki et al. | 380/255 |
| 2004/0240412 A1 * | 12/2004 | Winget | 370/331 |
| 2004/0242228 A1 * | 12/2004 | Lee et al. | 455/432.1 |
| 2005/0047597 A1 * | 3/2005 | Zheng | 380/247 |
| 2005/0216736 A1 * | 9/2005 | Smith | 713/168 |
| 2007/0003062 A1 * | 1/2007 | Mizikovsky et al. | 380/270 |
| 2009/0019284 A1 * | 1/2009 | Cho et al. | 713/170 |

FOREIGN PATENT DOCUMENTS

| | | |
|---|---|---|
| EP | 1 414 214 A2 | 4/2004 |
| JP | 7-193569 | 7/1995 |

OTHER PUBLICATIONS

Johnston, David, "Mutual Authorization for PKMv2", Jul. 8, 2004, pp. 0-6.*

Mandin, Jeff, "Enhancement of 802.16e to Support EAP-based Authentication/Key Distribution Rev. 0", Jan. 4, 2004 pp. 0-6.*

Datta, Anupam et al., "802.16e Notes—Mitchell Group", Jun. 6, 2005, pp. 1-4.*

Security Association Establishment for PKMvZ-EAP, Mi-Young Yun, et al., IEEE 802.16 Broadband Wireless, Access Working Group, Aug. 18, 2004.

Dierks et al., The TLS Protocol Version 1.0, Network Working Group, Jan. 1999.

Johnston et al., Overview of IEEE 802.16 Security, IEEE Security & Privacy, vol. 2, Issue 3, Jun. 2004.

* cited by examiner

| Characteristic | Content |
|---|---|
| Security capability | Describe security and encryption capability |
| Primary SAID | Basic SAID of subscriber station(Basic CID) |
| HMAC tuple | Encryption hash for a message |

FIG.7

| Characteristic | Content |
|---|---|
| Key sequence number | Information about a sequence number of AK |
| SA descriptor | Complex descriptor for defining SAID and additional security association characteristic |
| HMAC tuple | Encryption hash for a message |

FIG.8

| Characteristic | Content |
|---|---|
| Error code | code for identifying a denial reason for the security association capability request message |
| HMAC tuple | Encryption hash for a message |

METHOD FOR SECURITY ASSOCIATION NEGOTIATION WITH EXTENSIBLE AUTHENTICATION PROTOCOL IN WIRELESS PORTABLE INTERNET SYSTEM

BACKGROUND OF THE INVENTION (a) Field of the Invention

The present invention relates to a security association negotiation method of extensible authentication protocol (EAP) for authenticating a subscriber station user in a wireless portable Internet system. More particularly, the present invention relates to a security association negotiation method for generating an authentication key without an additional message exchange in an authentication scheme using EAP in a wireless portable Internet system.

(b) Description of the Related Art

As the next-generation communication technology, wireless portable Internet further provides mobility to a local data communication system such as a conventional wireless local area network (LAN) using a stationary access point (AP). There are various standard protocols that have been developed for supporting the wireless portable Internet, and the IEEE 802.16 working group attempts to establish an international standard of the wireless portable Internet protocol.

The authentication and authorization standard defined by the IEEE 802.16 establishes authentication functions for stations in a wide area network configured with wireless networks. In particular, since the subscriber station (SS) authentication function standardized by a privacy layer of the IEEE 802.16 is defined only for SSs within a fixed network, it is inappropriate for the authentication function to apply SSs or subscribers to be capable of supporting mobility, which is a current trend of mobile services. That is, in the wireless portable Internet system, the subscriber station has mobility, so it moves from a base station to another base station, and when a handover occurs, authentication key generation and security association negotiation need to be performed with a new base station.

As methods for authenticating a mobile terminal or a user, a PKM—(public key management) RSA method which utilizes a certificate of the mobile terminal and a PKM-EAP method for authenticating a mobile subscriber are defined. As such authentication methods, the PKMv1 protocol may be exemplified. According to the PKMv1 protocol, a terminal is authenticated by using a certificate of a mobile terminal in the IEEE 802.16 standard, and an authentication key (AK) and a traffic encryption key (TEK) are generated.

In addition, a newly defined PKMv2 protocol provides more various authentication methods than does the PKMv1 protocol. When classifying with reference to an authentication subject, the PKM-RSA method for authenticating a mobile terminal, the PKM-EAP method for authenticating a mobile subscriber, and PKM-RSA with EAP for authenticating both a mobile terminal and a mobile subscriber may be exemplified. According to the basic design concept of the PKMv2 protocol, the authentication key is generated by using a master key (MK) which may be obtained after authentication of a mobile terminal or a user.

However, according to the prior art, in the subscriber authentication methods such as EAP, the authentication key is generated after authenticating a mobile subscriber and exchanging the master key (MK) and random numbers of the base station and the subscriber station. In other words, it does not follow the basic design concept of the PKMv2 protocol. Therefore, when a handover of the subscriber station occurs, an additional message exchange is necessary, and the exchange of the random numbers through an authentication message is necessary for generating the authentication key for a new base station.

These problems of the prior art cause mobility of the subscriber station in the wireless portable Internet system to be reduced, and delay the data transmission.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a security association negotiation method having the advantage of corresponding to a basic design concept of the PKMv2 protocol.

An exemplary security association negotiation method using a user authentication in a wireless portable Internet system according to an embodiment of the present invention includes the following steps. A base station generates an authentication key for authenticating a user of a subscriber station. The base station receives a security association capability request message including security association capability information of the subscriber station from the subscriber station after generating the authentication key. The base station determines whether the base station is able to accept a security association capability of the subscriber station included in the security association capability request message. The base station transmits a security association capability response message including the security association capability information which is selected for a security association with the subscriber station by the base station when the security association capability of the subscriber station can be accepted.

An exemplary security association negotiation method using a user authentication in a wireless portable Internet system according to another embodiment of the present invention includes the following steps. A first base station generates a second authentication key by transmitting a master key, which is to be a seed of a first authentication key of a subscriber station which hands over to a second base station; to the second base station. The first base station provides a first security association descriptor including security association capability information, which is previously negotiated with the subscriber station, to the second base station. The subscriber station exchanges a register request message (REG-REQ) and a register response message (REG-RSP) with the second base station. A second security association descriptor generated based on the first security association descriptor is provided by using the register response message to the subscriber station, and it is determined whether a security association capability is fulfilled. A security association identifier included in the second security association descriptor is admitted and a security association is renewed when the security association capability is fulfilled.

DETAILED DESCRIPTION OF THE EMBODIMENTS

An embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification. (Phrases such as "one thing coupled to another" can refer to either directly coupling a first one to a second one or coupling the first one to the second one with a third one provided therebetween.)

Hereinafter, a security association negotiation method according to an exemplary embodiment of the present invention will be described in detail while referring to drawings.

Figure 1:
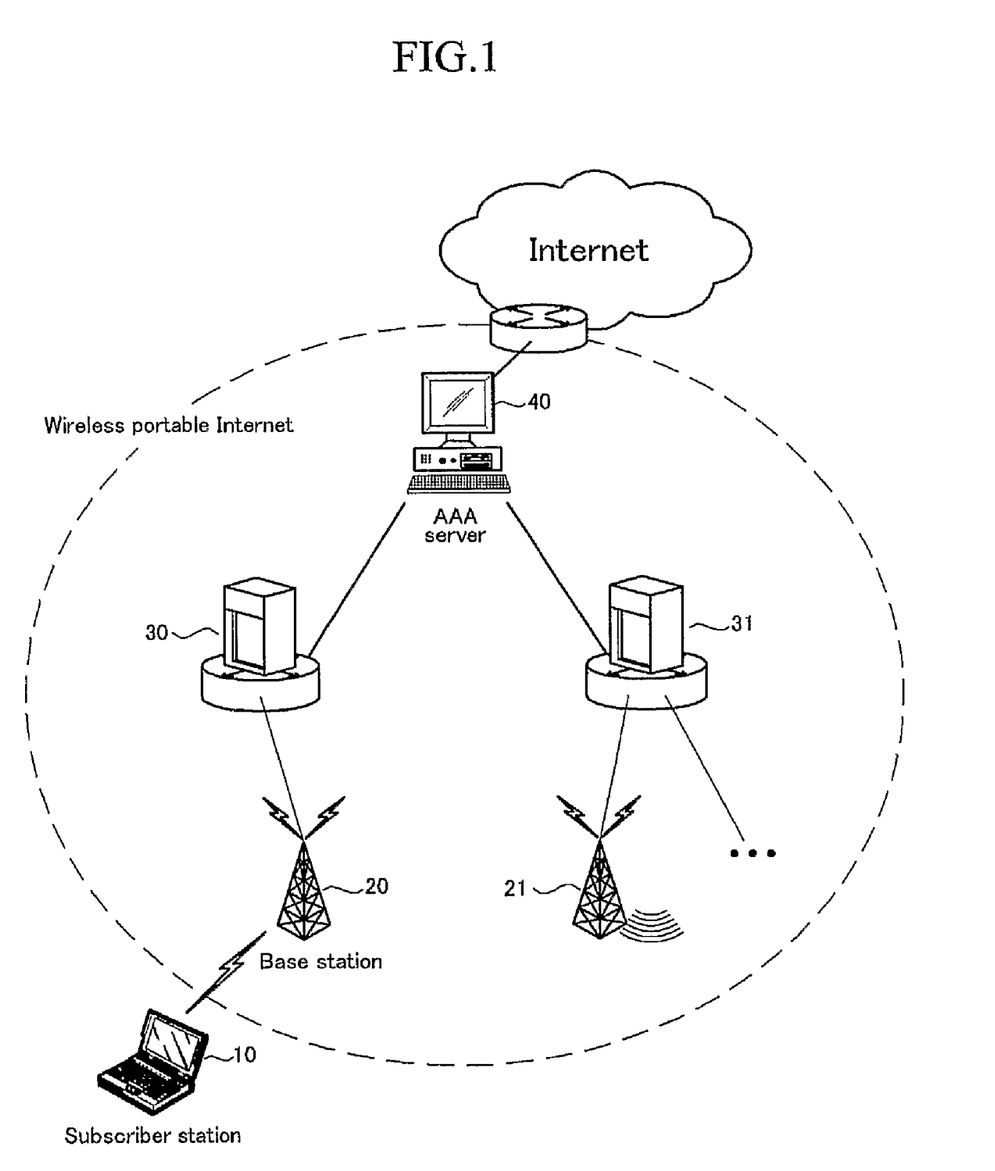
FIG. 1 is a schematic diagram illustrating a configuration of wireless portable Internet according to an exemplary embodiment of the present invention.

FIG. 1 is a schematic diagram illustrating a configuration of wireless portable Internet according to an exemplary embodiment of the present invention.

As shown in FIG. 1, the wireless portable Internet system includes a subscriber station 10 (SS), base stations 20 and 21 (BS) performing a wireless communication with the subscriber station 10, routers 30 and 31 connected with the base stations 20 and 21 through a gateway, and an AAA server (AAA: authentication, authorization, and accounting) 40 connected to the routers 30 and 31 for performing an authentication for the subscriber station 20 and 21.

A conventional wireless LAN such as IEEE 802.11 provides a data communication scheme in which only near distance wireless communication using a stationary access point is possible. Therefore, this does not support the mobility of the subscriber station, and merely support a wireless local data communication.

Meanwhile, the wireless portable Internet system being developed by the IEEE 802.16 group supports the mobility even when the subscriber station 10 shown in FIG. 1 moves from a cell controlled by the base station 20 to a cell controlled by the base station 21, so that it can provide the data communication service.

The IEEE 802.16 is a standard for supporting metropolitan area network (MAN). In other words, it supports a middle size network between local area information communication network (LAN) and wide area communication network (WAN).

Therefore, the wireless portable Internet system supports a handover of the subscriber station 10 like a mobile communication service, and performs a dynamic IP address allocation according to movement of the subscriber station.

Here, the subscriber station 10 and the base stations 20 and 21 of the wireless portable Internet performs a communication in the orthogonal frequency division multiplexing access (OFDMA) scheme. The OFDMA scheme is a multiplexing scheme that combines the frequency division multiplexing scheme using a plurality of orthogonal frequency sub-carriers as a plurality of sub-channels, and the time division multiplexing (TDM) scheme. The OFDMA scheme is robust against fading occurring in a multi-path, and shows a good data transmission rate.

When starting a communication, the subscriber station 10 and the base stations 20 and 21 negotiate an authentication mode for an authentication of the subscriber station 10; and perform an authentication process according to the negotiated authentication mode. That is, the subscriber station 10 and the base stations 20 and 21 select the authentication mode from an authentication mode based on a digital certificate according to the conventional IEEE 802.16 privacy standard and another authentication mode based on standardized authentication protocol of a higher layer, and according to the selected authentication mode, performs the authentication process for the subscriber station 10.

Here, the standardized authentication protocol of the higher layer may be one of EAP-TLS (Transport Layer Security) which is an EAP framework, or EAP-TTLS (Tunneled TLS).

When the authentication mode based on the standardized authentication protocol of the higher layer is selected as a result of the negotiation between the subscriber station 10 and the base stations 20 and 21, the subscriber station 10 and base station 20 are ready for an authentication process based on the standardized authentication protocol of the higher layer. The subscriber station 10 generates a message for the authentication and transmits it to the base station 20, and the base station 20 performs the authentication for the subscriber station 10 through an interaction with the AM server 40.

Figure 2:
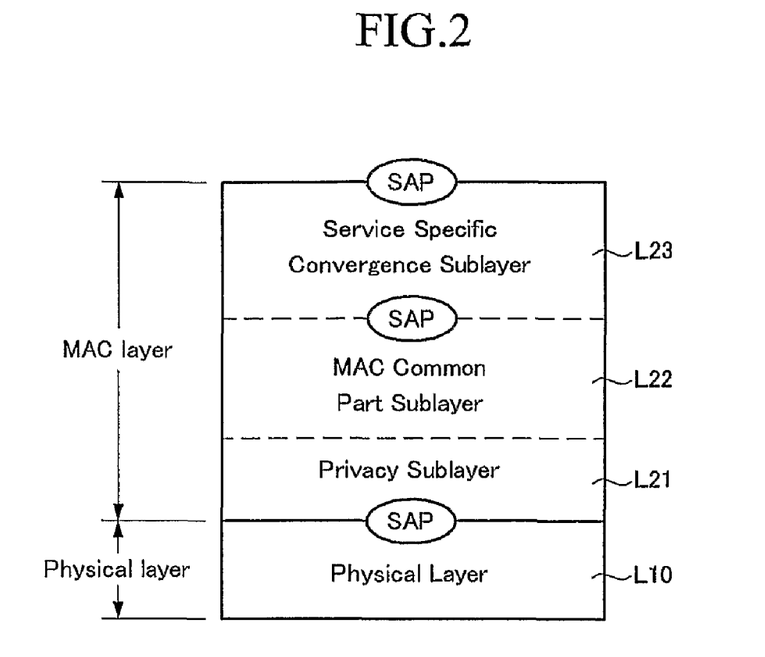
FIG. 2 shows a layer structure of the wireless portable Internet system shown in FIG. 1.

FIG. 2 is a layer diagram showing a layer structure of the wireless portable Internet system shown in FIG. 1.

As shown in FIG. 2, the layer structure of the wireless portable Internet system according to IEEE 802.16 includes a physical layer L10 and media access control (MAC) layers L21, L22, and L23.

The physical layer L10 provides wireless communication functions performed by a typical physical layer such as modulation/demodulation and coding.

Contrarily to the wire Internet system having fractionated layers according to various functions thereof, the wireless portable Internet system has one MAC layer for providing various functions.

The MAC layer includes a privacy sub-layer L21, a MAC common part sub-layer L22, and a service specific convergence sub-layer L23.

The privacy sub-layer L21 performs equipment authentication, security key exchange, encryption, etc. The privacy sub-layer L21 performs the authentication only for equipment, and a user authentication such as the EAP is performed by a higher layer of MAC (not shown).

The MAC common part sub-layer L22 is a core part of the MAC layer, and it performs system access, bandwidth allocation, traffic connection set up and maintenance, QoS management, etc.

The service specific convergence sub-layer L23 performs payload header suppression, QoS mapping, etc., in continuous data communication.

Figure 3:
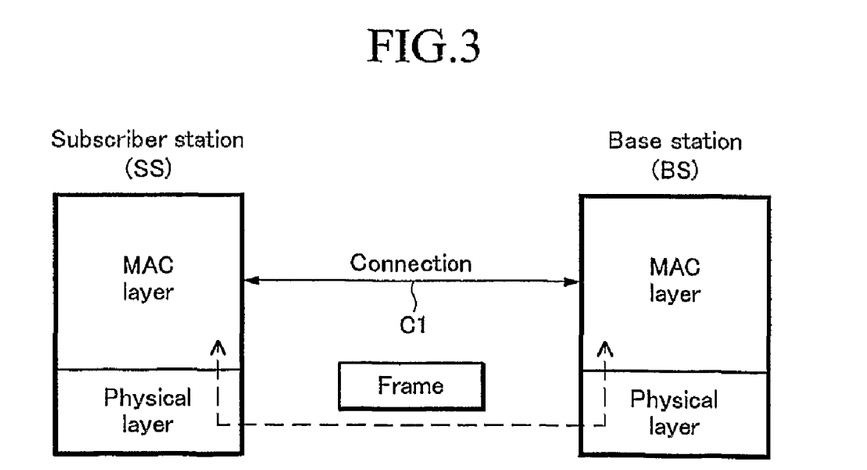
FIG. 3 is a schematic diagram illustrating a connection between a subscriber station and a base station in the wireless portable Internet system shown in FIG. 1.

FIG. 3 shows a connection configuration between the subscriber station 10 and the base station 20 and 21 of the wireless portable Internet system shown in FIG. 1.

As shown in FIG. 3, there exists a traffic connection C1 between the MAC layer of the subscriber station 10 and the MAC layer of the base stations 20 and 21.

Here, the term "traffic connection C1" does not mean a physical connection but rather a logical connection, and is defined as a mapping relationship which is formed between peers of the equivalent MAC layers in order to transmit traffic for a service flow.

Therefore, a parameter or a message defined on the traffic connection C1 are functions performed between the equivalent MAC layers. Actually, the parameter and the message are processed to be a frame, and are transmitted through the physical layer. Then, the frame is analyzed, and the functions corresponding to the parameter or the message are performed in the MAC layer.

In addition, a MAC message includes various messages such as a request for some operation (REQ), a response (RSP), and an acknowledgement (ACK).

Figure 4:
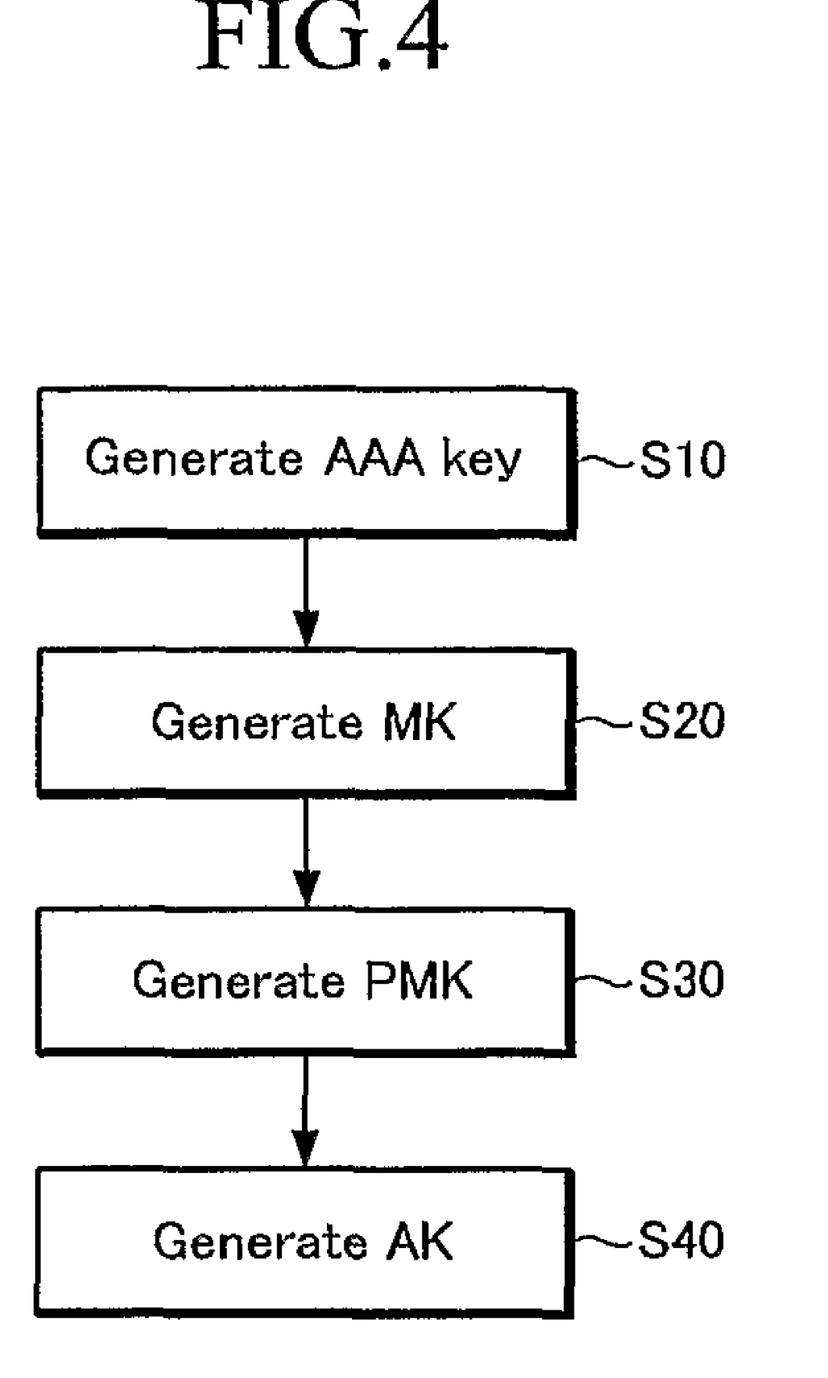
FIG. 4 is a flowchart showing an authentication key generating process using EAP according to an exemplary embodiment of the present invention.

FIG. 4 is a flowchart showing a process for generating an authentication key using EAP according to an exemplary embodiment of the present invention.

When the subscriber station 10 is trying to connect with the base station, an authentication process between the AAA server 40 and the subscriber station 10 is performed, and then an AAA key is generated in step S10. That is, the subscriber station transmits an EAP transmission request message which is a high authentication protocol to the base station, and the authentication server distributes the MA key which is generated by performing authentication and authority verification to the base station and the subscriber station. After that, the AAA is used as a seed of an authentication key (AK).

When the AAA key is generated, a master key MK is generated from the AAA key. The master key MK may be generated by using 160 bits of the most significant bit (MSB) of the AAA key in step S20.

When the master key MK is generated, a pre-master key PMK is generated by using an identifier of the subscriber station and an identifier of the base station in step S30.

When the pre-master key PMK is generated, the authentication key AK for the EAP authentication is generated in the subscriber station and the base station. The authentication key is distributed to the subscriber station and the base station. In the exemplary embodiment of the present invention, only the authentication using the EAP is described, but the authentication key may also have a field for an RSA authentication. According to an exemplary embodiment of the present invention, the field for the RSA authentication is given to be NULL.

According to the exemplary embodiment shown in FIG. 4, the negotiation process and the authentication process for the security association (SA) are not operated together but are operated separately.

Figure 5:
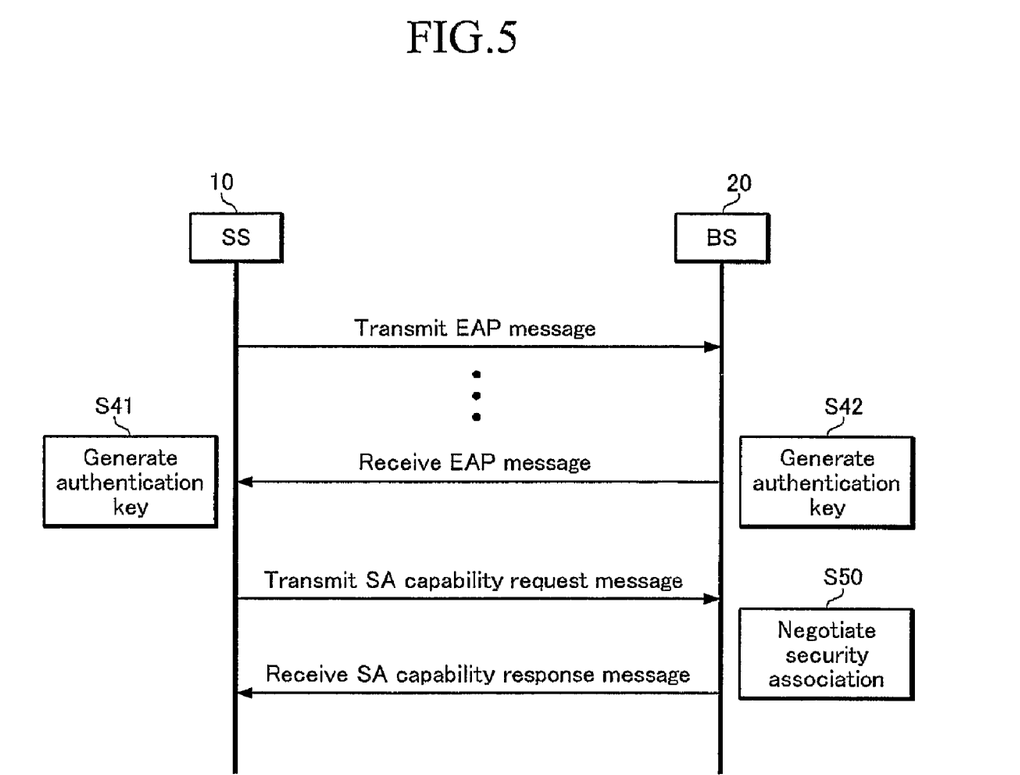
FIG. 5 shows a message flow illustrating an authentication process according to an exemplary embodiment of the present invention.

FIG. 5 shows a message flow illustrating the authentication process according to an exemplary embodiment of the present invention.

The generation of the authentication key shown in FIG. 4 is performed by transmitting/receiving a plurality of EAP-transmission messages between the subscriber station 10 and the base station 20. An EAP message, which the subscriber station 10 requests to the base station 20, includes packet data supported by the subscriber station which requests the authentication, an identifier for an encryption/authentication algorithm, a basic CID for the subscriber station, and an EAP payload which is authentication data for the user authentication. Another EAP message, that the base station 20 receiving the AAA key form the AAA server 40 (not shown in FIG. 5) transmits, includes the encryption algorithm co-owned with the subscriber station, notification of success or failure of the authentication, valid time for the authentication key, and the EAP payload for the user authentication.

The EAP message request and response process may be performed several times until the authentication key is generated. When the authentication for the subscriber is successfully performed after the exchange of the EAP messages, notification of success in the authentication for the EAP-transmission message is lastly transmitted to the subscriber station 10, and authentication keys AK of the subscriber station 10 and the base station 20 are generated in step S41 and S42.

According to an exemplary embodiment of the present invention, the security association negotiating process is performed separately from the authentication key generating process in step S50. For the security association negotiation, in an exemplary embodiment of the present invention, a security association capability request message and a security association capability response message are newly defined.

The subscriber station 10 transmits the security association (SA) capability request message including an HMAC tuple TLV generated by using the authentication key (AK). The base station 20 inspects suitability of the HMAC tuple, and transmits the security association capability response message to the mobile subscriber station. When the base station cannot accept the security association capability request which is requested by the mobile subscriber station, the base station 20 transmits a security association capability deny message to the mobile subscriber station.

Through the security association negotiation process, a security association capability corresponding to an intersection of the security association capabilities of the subscriber station 10 and the base station 20 is selected.

Figure 6:
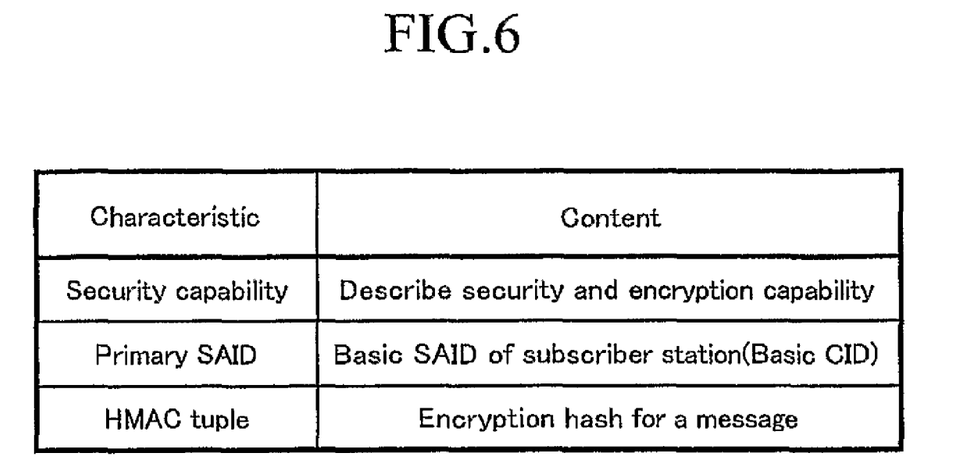
FIG. 6 to FIG. 8 show message configurations for security association negotiation according to an exemplary embodiment of the present invention.
Figure 7:
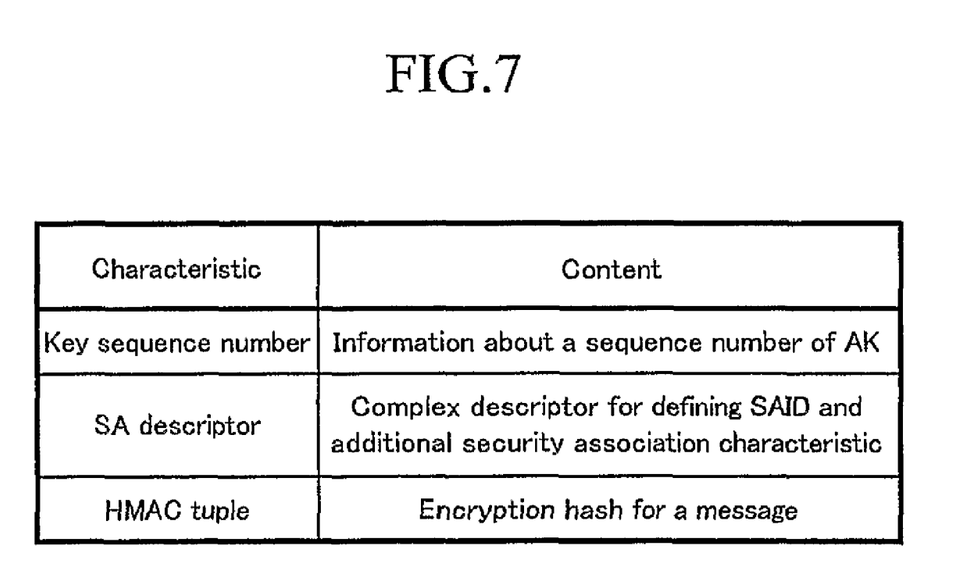
Figure 8:
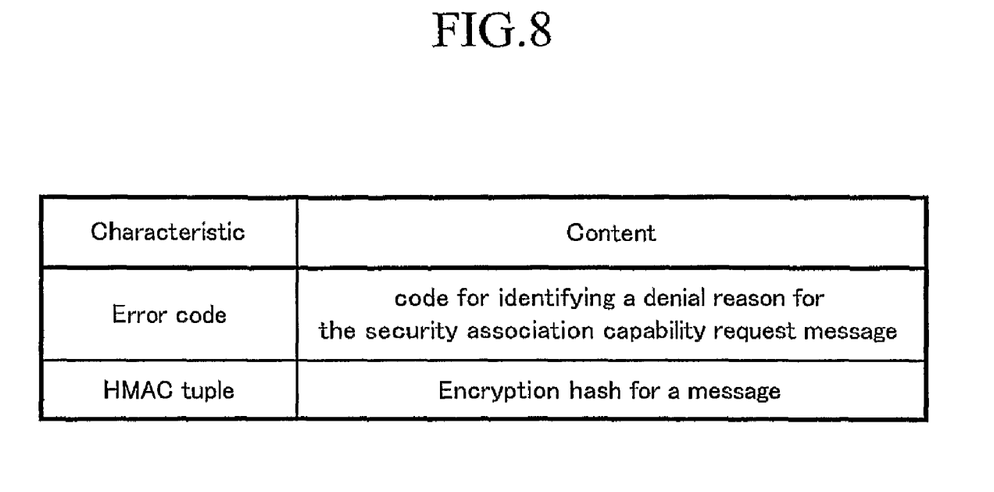

FIG. 6 to FIG. 8 show configurations of messages for the security association negotiation according to an exemplary embodiment of the present invention.

FIG. 6 shows a configuration of the security association capability request message according to an exemplary embodiment of the present invention.

After the EAP authentication, the subscriber station transmits the security association capability request message as shown in FIG. 6 to the base station. The security association capability request message includes security capability, primary security association identifier (SAID), and characteristics of the HAMC tuple.

In the message shown in FIG. 6, the security capability is information about all capabilities of the security and encryption owned by the subscriber station. The primary SAID is an identifier for the security association (SA) of the subscriber station. It includes a basic CID.

HMAC tuple is generated by using the authentication key (AK). When performing an initial authentication, a key sequence number in the HMAC tuple is generated by using a hash function. Here, the authentication key (AK) is used as an input value for the hash function.

FIG. 7 shows a configuration of the security association capability response message according to an exemplary embodiment of the present invention.

The security association capability response message is a response for the security association capability request message. It is transmitted when the base station can accept the request of the subscriber station. The security association capability response message includes the key sequence number, a security association descriptor (SA descriptor), and characteristics of the HMAC tuple.

The key sequence number is information about a sequence number of the authentication key (AK). This may be generated by adding 1 to a previous key sequence number by the base station. The security association descriptor is a complex descriptor. It defines a security association identifier (SAID) and additional characteristics of the security association. Here, the security association identifier (SAID) is an identifier for a cipher suit which is selected for a basic security association of the subscriber station. The security association descriptor includes information about a data encryption algorithm corresponding to the SAID, a message authentication scheme, and a traffic key encryption scheme.

For example, for a SAID 1, it may described that a DES algorithm is used for the data encryption algorithm, HMAC is used for the message authentication, and a 3DES algorithm is used for the traffic key encryption.

The HMAC tuple is generated by using the authentication key (AK). When performing the initial authentication, a key sequence number in the HMAC tuple is generated by putting the authentication key (AK) as an input value for the hash function.

FIG. 8 shows the security association capability request deny message according to an exemplary embodiment of the present invention.

The security association capability request deny message includes an error code for identifying a denial reason for the security association capability request message, and the HMAC tuple is generated by using the authentication key.

According to an exemplary embodiment of the present invention, a security association negotiation may be provided through the security association capability request message and the security association capability response message after generating the authentication key.

Figure 9:
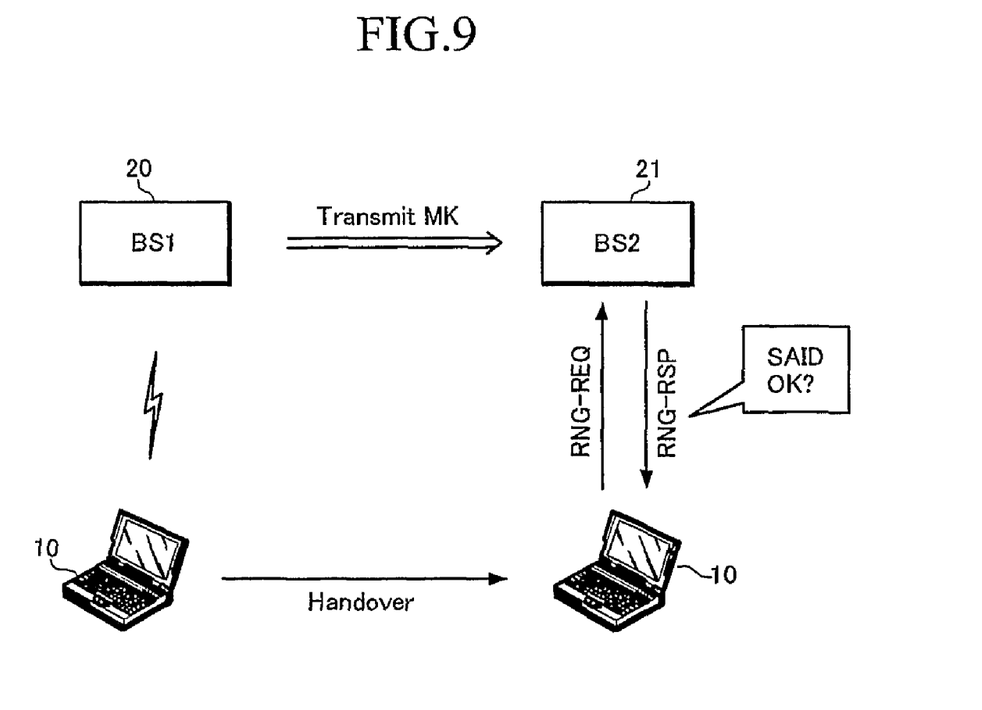
FIG. 9 illustrates a method for performing EAP authentication and security association negotiation after a handover according to an exemplary embodiment of the present invention.

FIG. 9 is showing an EAP authentication and security association negotiation method after a handover according to an exemplary embodiment of the present invention.

When a handover occurs in the subscriber station 10 from the base station 20 to the base station 21, the base station 21, which is a target base station, receives the master key from the base station 20 in order to generate the authentication key, and performs an authentication with the subscriber station 10. The base station 21, which has received the master key, generates the pre-master key (PMK) and the authentication key (AK) by using its own base station identifier.

In addition, a ranging process is performed for an initial timing synchronization. In order to register the subscriber station after the ranging process, a register request message (REG-REQ) and a register response message (REG-RSP), which are MAC messages, are exchanged.

It is determined when the security association capability is fulfilled with reference to the security association descriptor identifier (ID) included in the security association descriptor information received from the base station 20. When the subscriber station 10 selects the security association identifier which is one of the previously negotiated security association capabilities, the EAP authentication and security association of the subscriber station may be performed without an additional message.

When the security association negotiation of the base station 21 which is the target base station is newly needed, the subscriber station may transmit a security association capability adding message for the additional security association negotiation. The security association capability adding message may be provided in substantially the same scheme as the security association capability request message.

Therefore, according to the exemplary embodiment of the present invention, after the handover, the efficient EAP authentication and security association negotiation which corresponds to the PKMv2 design concept can be provided without additional message exchanges between the base station and the subscriber station, such as the random number exchange.

Figure 10:
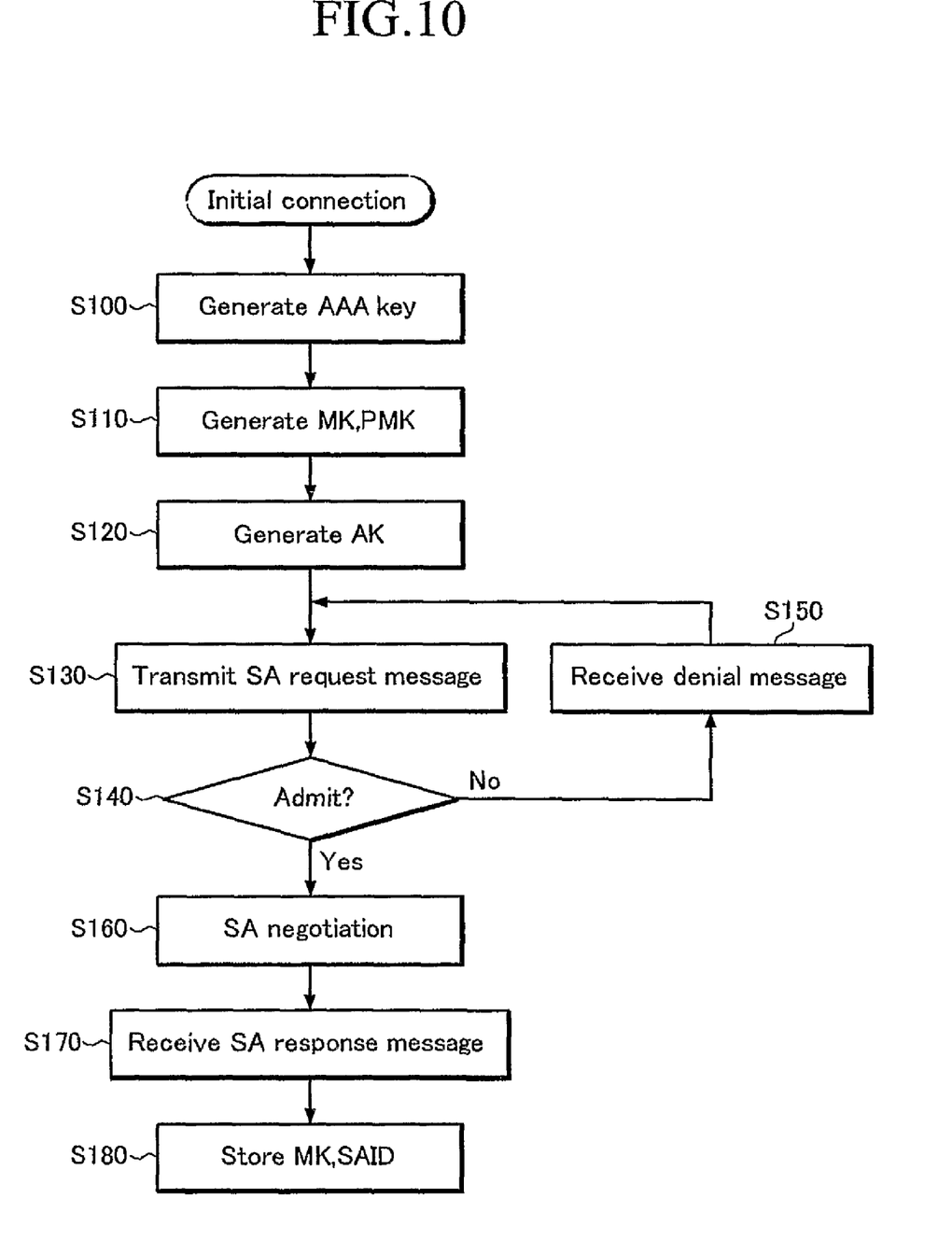
FIG. 10 is a flowchart showing a security association negotiation method according to an exemplary embodiment of the present invention.

FIG. 10 is a flowchart showing a security association negotiation method according to an exemplary embodiment of the present invention.

When the subscriber station tries an initial access with the base station, the subscriber station performs the authentication process with the AAA server, and the AAA key is randomly generated in step S100. The AAA key is distributed to the base station and the subscriber station, and is utilized as a seed of the authentication key.

The base station and the subscriber station generate the master key (MK) and the pre-master key (PMK) from the AAA key in step S110. In order to reduce size, the master key (MK) is generated by using a part of the AAA. The pre-master key (PMK) may be generated by using the master key, the subscriber station, and the base station.

When the pre-master key is generated, the base station and the subscriber station respectively generate the authentication key (AK) in step S120. Through the described process, the subscriber station and the base station may generate the authentication key (AK) corresponding to the design concept of the PKMv2 protocol.

When the authentication key is generated, the subscriber station transmits the security association capability request message to the base station in step S130. For the security association capability request message, a PKM-REQ message defined by the PKM protocol may be used. The security association capability request message includes information about basic security capabilities of the subscriber station and a basic security association identifier of the subscriber station.

When the base station receives the security association capability request message, it determines whether the request of the subscriber station can be accepted in S140. An admission for the security association capability request depends on whether an intersection, between the security association capability which the base station can provide and the security association capability which the subscriber station requested, exists or not.

When the security association capability requested by the subscriber station can be admitted, then the security association negotiation is performed, the security association capability response message is transmitted, and the subscriber station receives the security association capability response message in step S170. The security association capability response message includes the security association identifier (SAID) and the security association descriptor which defines the additional characteristic.

When the generation of the authentication key and the security association negotiation are finished, the master key (MK) and the security association identifier (SAID) related to the negotiated security association capability are stored. This enables reuse of the master key security association identifier in the EAP authentication, when the handover occurs, in step S180.

Meanwhile, when the security association capability requested by the subscriber station cannot be accepted, or when there is an error in the security association capability request message, a deny message including an error code is transmitted, and the subscriber station receives the deny message in step S150.

Figure 11:
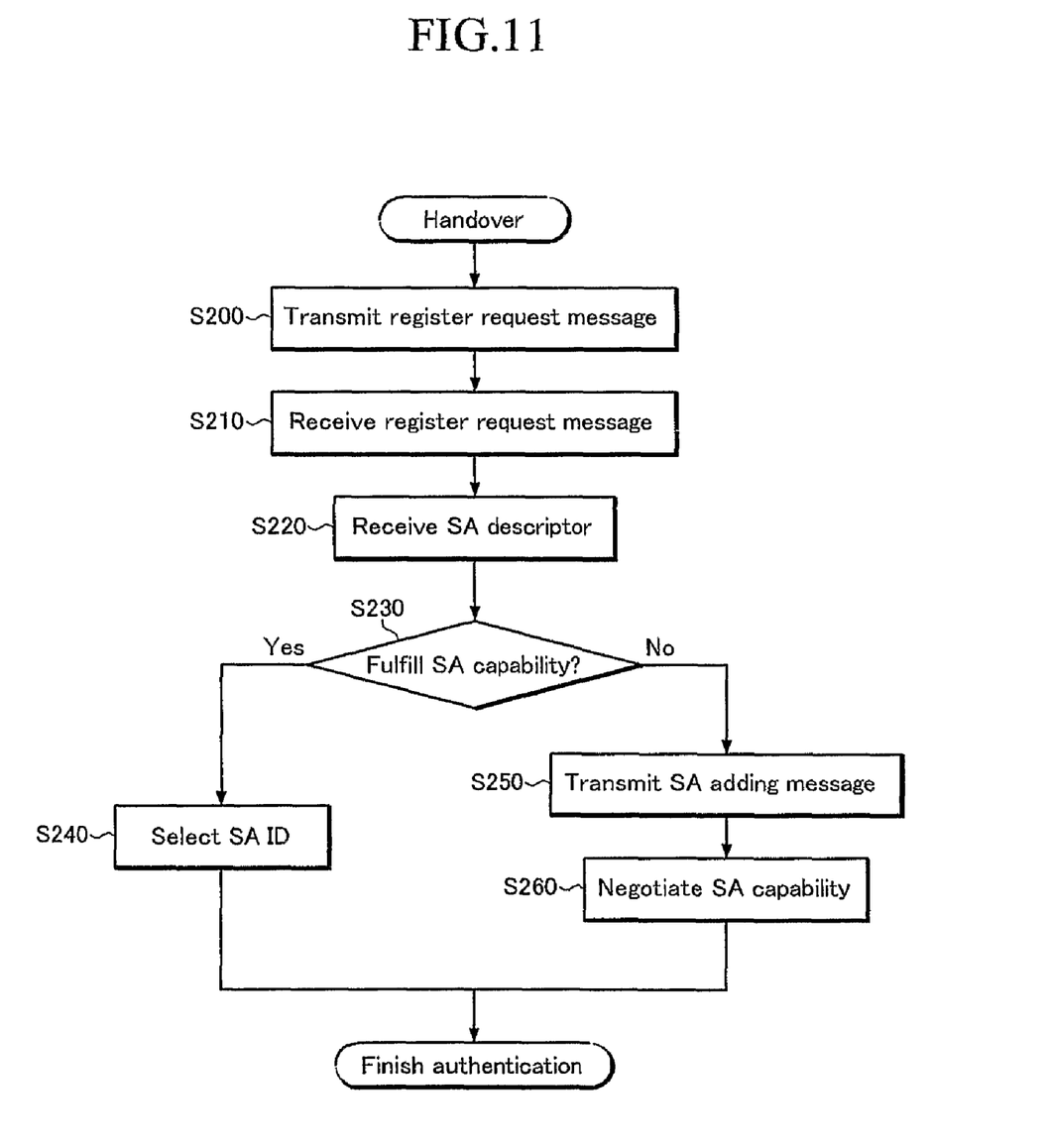
FIG. 11 is a flowchart showing a method for performing a security association negotiation when a handover occurs, according to an exemplary embodiment of the present invention.

FIG. 11 is a flowchart showing a method for performing the security association negotiation when a handover occurs, according to an exemplary embodiment of the present invention.

The second base station generates the pre-master key by using the master key (MK) received from the first base station, and generates the authentication key by using the pre-master key, when the handover occurs because the subscriber station moves from the first base station to the second base station.

The subscriber station exchanges the register request message (REG-REQ) and the register response message (REG-RSP) in steps S200 and S210, in order to process a CID (connection ID) synchronization with the second base station.

The second base station transmits the register response message for a security association (SA) renewal by using the ranging response message. Here, the register response message is based on the security association capability information received from the first base station. The subscriber station receives the register response message in step S220.

The subscriber station determines whether the security association capability corresponding to the security association identifier included in the security association descriptor fulfills the security association capability previously negotiated with the first base station in step S230.

When the previously negotiated security association capability is fulfilled, the corresponding security association identifier (SAID) is renewed, and the EAP authentication is finished in step S240.

When the security association capability of the second base station can not fulfill the security association capability of the subscriber station, a security association adding message is transmitted, and the security association negotiation is performed with the second base station in steps S250 and S260. The security association negotiation can be performed by using the security association capability request message and the security association capability response message.

According to the embodiments of the present invention, the present invention provides an efficient security association negotiation method having the advantage that the method corresponds to the design concept of the PKMv2 protocol in the EAP authentication of a mobile subscriber station.

In addition, according to the embodiments of the present invention, the authentication and the security association negotiation can be performed without additional exchange of a message or a random number even after the handover, so that the present invention may minimize transmission of messages and provide a delay-free communication environment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a base station to negotiate security with a subscriber station, the method comprising:
   generating an authentication key;
   receiving, from the subscriber station, a first message including a first message authentication code and information on security capabilities of the subscriber station;
   inspecting validity of the first message authentication code;
   selecting one or more of the security capabilities for security association with the subscriber station, if the first message authentication code is valid;
   generating a second message authentication code using the authentication key; and
   transmitting, to the subscriber station, a second message including the second message authentication code and the one or more of the security capabilities,
   wherein the security capabilities includes information about all capabilities of security and encryption of the subscriber station.

2. The method of claim 1, wherein the second message includes a security association descriptor defining a security association identifier and additional characteristics of the security association.

3. The method of claim 2, wherein the first message includes at least one of a data encryption algorithm and a traffic key encryption algorithm that the subscriber station can use.

4. The method of claim 1, wherein the first message and the second message are defined in a public key management protocol, and
   wherein the authentication key is generated by using an extensible authentication protocol.

5. The method of claim 1, wherein generating the authentication key comprises:
   generating a master key using an authentication authorization accounting key from an authentication authorization accounting server;
   generating a pre-master key using an identifier of the base station, an identifier of the subscriber station, and the master key; and
   generating the authentication key using the pre-master key.

6. The method of claim 1, further comprising transmitting, to the subscriber station, a security association denial reason message including an error code for denying the security association with the subscriber station, when the security capabilities of the subscriber station are not acceptable.

7. The method of claim 1, wherein the first message further includes a primary security association identifier, and
   wherein the second message further includes information about a sequence number of an authentication key.

8. The method of claim 1, wherein the one or more of the security capabilities which are supported by both the subscriber station and a base station are selected among the security capabilities of the subscriber station.

9. A method for a subscriber station to negotiate a security with a base station, the method comprising:
   generating an authentication key;
   generating a first message authentication code using the authentication key;
   transmitting, to the base station, a first message including the first message authentication code and information on security capabilities of the subscriber station; and
   receiving, from the base station, a second message including a second message authentication code and information on the security capabilities that the base station selects for a security association with the subscriber station, wherein the security capabilities includes information about all capabilities of security and encryption of the subscriber station.

10. The method of claim 9, wherein the second message includes a security association descriptor defining a security association identifier and additional characteristics of the security association, and wherein the security association descriptor includes information on at least one of a data encryption algorithm and a traffic key encryption algorithm for the security association.

11. The method of claim 9, wherein the first message includes at least one of a data encryption algorithm and a traffic key encryption algorithm that the subscriber station can use.

12. The method of claim 9, wherein the first message and the second message are defined in the public key management protocol, and wherein the authentication key is generated by using an extensible authentication protocol.

13. The method of claim 9, wherein generating the authentication key comprises:

generating a master key using an authentication authorization accounting key from an authentication authorization accounting server;

generating a pre-master key using an identifier of the base station, an identifier of the subscriber station, and the master key; and generating the authentication key using the pre-master key.

14. The method of claim 9, further comprising receiving, from the base station, a security association denial reason message including an error code for denying the security association when the security capabilities of the subscriber station are not acceptable in the base station.

15. The method of claim 9, wherein the first message further includes a primary security association identifier, and wherein the second message further includes information about a sequence number of an authentication key of the base station.

16. The method of claim 9, wherein the security capabilities that the base station selects are supported by both the subscriber station and a base station, and are selected among security capabilities of the subscriber station.

17. A wireless communication system, comprising:

a subscriber station configured to generate a first message authentication code using an authentication key, and to transmit a first message including the first message authentication code and information on security capabilities of the subscriber station; and a base station configured to receive the first message from the subscriber station, to inspect validity of the first message authentication code, to select one or more of the security capabilities for security association with the subscriber station if the first message authentication code is valid, to generate a second message authentication code using the authentication key, and to transmit a second message including the second message authentication code and the one or more of the security capabilities to the subscriber station, wherein the security capabilities includes information about all capabilities of security and encryption of the subscriber station.

18. The system of claim 17, wherein the second message includes a security association descriptor defining a security association identifier and additional characteristics of the security association, and wherein the security association descriptor includes at least one of a data encryption algorithm and a traffic key encryption algorithm for the security association.

19. The system of claim 17, wherein the first message includes at least one of a data encryption algorithm and a traffic key encryption algorithm for use by the subscriber station.

20. The system of claim 17, wherein the base station selects the one or more of the security capabilities, which are supported by both the subscriber station and a base station, and are selected among the security capabilities of the subscriber station.

* * * * *